US010379926B2

(12) United States Patent
Chang et al.

(10) Patent No.: US 10,379,926 B2
(45) Date of Patent: *Aug. 13, 2019

(54) METHOD AND DEVICE FOR MONITORING DATA ERROR STATUS IN A MEMORY

(71) Applicant: Macronix International Co., Ltd., Hsinchu (TW)

(72) Inventors: Kuen Long Chang, Taipei (TW); Ken Hui Chen, Hsinchu (TW); Su Chueh Lo, Hsinchu (TW); Chia-Feng Cheng, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 341 days.

This patent is subject to a terminal disclaimer.

(21) Appl. No.: 14/596,768

(22) Filed: Jan. 14, 2015

(65) Prior Publication Data

US 2016/0041861 A1     Feb. 11, 2016

Related U.S. Application Data

(60) Provisional application No. 62/033,622, filed on Aug. 5, 2014.

(51) Int. Cl.
*G06F 11/07* (2006.01)
*G06F 11/10* (2006.01)
*G06F 12/02* (2006.01)

(52) U.S. Cl.
CPC ........ *G06F 11/0751* (2013.01); *G06F 11/073* (2013.01); *G06F 11/1048* (2013.01); *G06F 11/1068* (2013.01); *G06F 12/0246* (2013.01)

(58) Field of Classification Search
CPC ............. G06F 11/1068; G06F 11/1048; G06F 12/0246; G06F 3/0679
See application file for complete search history.

(56) References Cited

U.S. PATENT DOCUMENTS

| | | | |
|---|---|---|---|
| 6,199,140 B1* | 3/2001 | Srinivasan | G11C 15/04 365/49.17 |
| 9,274,586 B2* | 3/2016 | Iyer | G06F 1/3209 |
| 2004/0153902 A1* | 8/2004 | Machado | G06F 11/1068 714/710 |
| 2009/0037720 A1* | 2/2009 | Cho | G06F 21/80 713/2 |
| 2009/0055695 A1* | 2/2009 | Maddali | G01R 31/3187 714/724 |
| 2014/0281819 A1* | 9/2014 | Wood | G11C 16/349 714/773 |

* cited by examiner

*Primary Examiner* — Jigar P Patel
(74) *Attorney, Agent, or Firm* — Finnegan, Henderson, Farabow, Garrett & Dunner LLP

(57) ABSTRACT

A method for monitoring data error status of a memory device includes generating, by a memory controller, a data status indication code indicating error status of a data chunk transmitted by the memory controller and outputting, by the memory controller, the data status indication code to a user interface.

17 Claims, 5 Drawing Sheets

METHOD AND DEVICE FOR MONITORING DATA ERROR STATUS IN A MEMORY

CROSS-REFERENCE TO RELATED APPLICATIONS

This application is based upon and claims the benefit of priority from Provisional Application No. 62/033,622, filed on Aug. 5, 2014, the entire contents of which are incorporated herein by reference.

TECHNOLOGY FIELD

The disclosure relates to operation of a memory and, more particularly, to a method and device for monitoring data error status in a memory device.

BACKGROUND

Data transmitted to or from a memory device may be lost or damaged. To mitigate or solve this problem, an error correcting code (ECC) can be added to a piece of data (also referred to as "user data" or "user code") written into a memory array of the memory device. The ECC can be generated by an ECC generator configured in a memory controller that controls the operation of the memory device. Usually, the user data and the corresponding ECC are stored in different portions of the memory array. The portion for storing user data is also referred to as a "normal array," while the portion for storing ECCs is also referred to as an "ECC array."

An ECC can be used to check whether corresponding user data contain any errors when the user data is read or transmitted from the memory device. If a correctable error exits, the ECC can also be used to correct the user data while the user data is being read or transmitted. Depending on the scheme adopted and the number of bits in the ECC, the ECC can correct a certain amount of fail bits in the corresponding user data. If the user data contain zero fail bits, they pass the check. If the number of fail bits in the user data is smaller than or equal to a maximum number of fail bits that the ECC can correct, the user data are correctable. But if the number of fail bits in the user data is larger than the maximum number, the user data are uncorrectable. For example, according to a Hamming code scheme, an ECC having eight ECC bits can be added to a chunk of user data containing 128 bits. Such an ECC allows one fail bit among the 128 bits to be corrected.

Conventionally, the error correction is performed inside the memory controller. A user may not know whether a piece of output data initially contains no error or is later corrected. That is, the user does not receive and thus cannot check a data error status of data stored in the memory device.

SUMMARY

In accordance with the disclosure, there is provided a method for monitoring data error status of a memory device. The method includes generating, by a memory controller, a data status indication code indicating error status of a data chunk transmitted by the memory controller and outputting, by the memory controller, the data status indication code to a user interface.

Also in accordance with the disclosure, there is provided a memory controller. The memory controller includes an error correcting code generator configured to generate a data status indication code indicating error status of a data chunk transmitted by the memory controller, and a status pin configured to output the data status indication code. The status pin is different from a data bus pin for outputting the data chunk.

Also in accordance with the disclosure, there is provided a memory controller. The memory controller includes an error correcting code generator configured to generate a data status indication code indicating error status of a data chunk transmitted by the memory controller, and a data processing circuit configured to combine the data status indication code with the data chunk to generate an output signal and output the signal to a data bus pin.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the disclosure include method and device for processing commands for monitoring data error status in a memory device.

Hereinafter, embodiments consistent with the disclosure will be described with reference to the drawings. Wherever possible, the same reference numbers will be used throughout the drawings to refer to the same or like parts.

Figure 1:
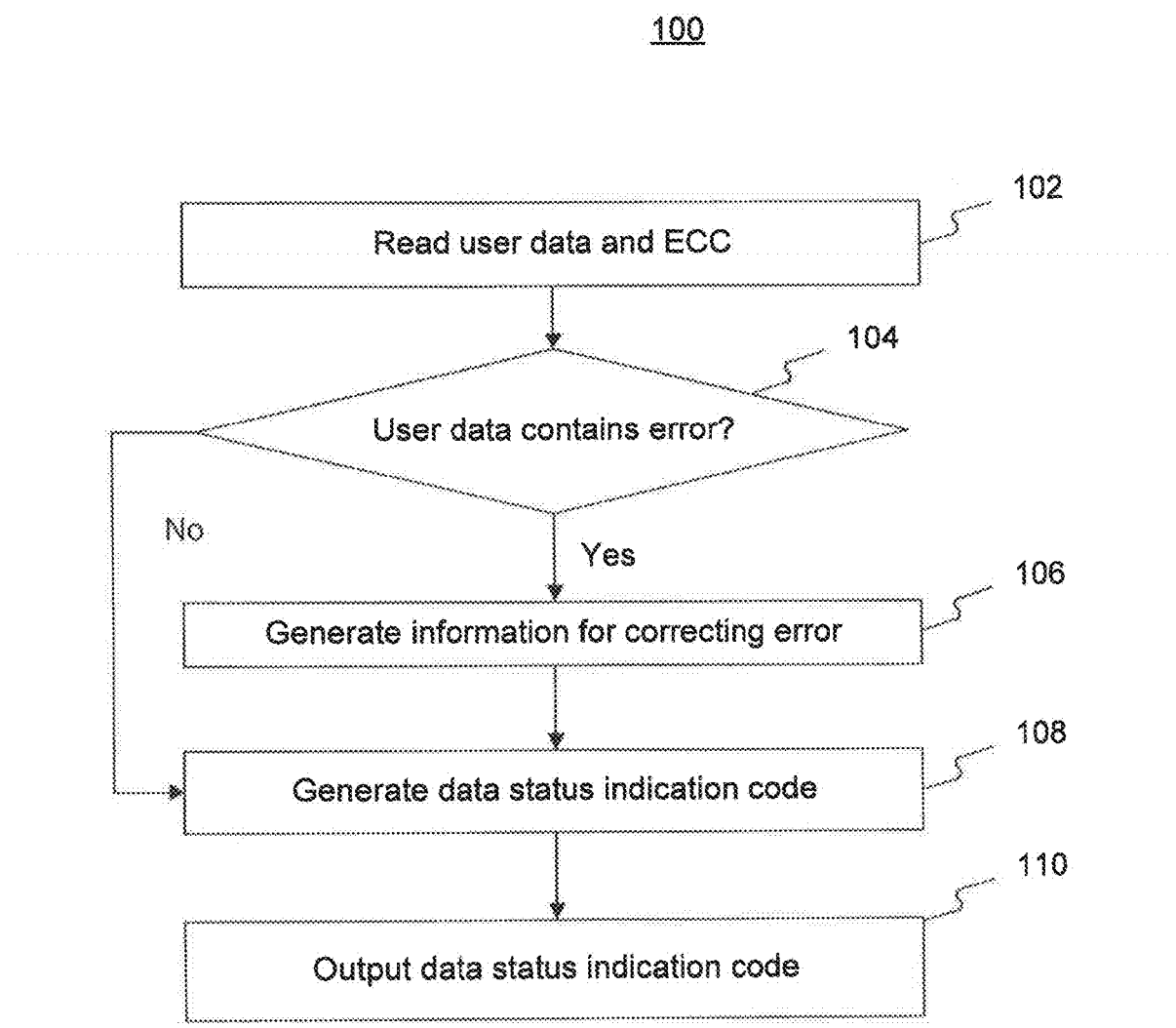
FIG. 1 is a flow chart showing a method for monitoring data error status in a memory device according to an exemplary embodiment.

FIG. 1 is a flow chart showing an exemplary method 100 for monitoring data error status in a memory device. The memory device includes a memory array storing user data and corresponding error correction codes (ECCs). The memory array includes a plurality of memory cells, each of which may store one or more data bits. In some embodiments, the user data and corresponding error correction codes are stored in different portions of the memory array. The portion for storing the user data is also referred to as a normal array and the portion for storing the ECCs is also referred to as an ECC array. The memory device also includes a memory controller to control its operation.

As shown in FIG. 1, at 102, the memory controller reads a piece of user data from the normal array and a corresponding ECC from the ECC array. Such a piece of user data is also referred to as a "data chunk." The data chunk may include, for example, 128 bits of user data. The corresponding ECC may include, for example, eight bits.

At 104, the memory controller checks whether the data chunk contains any error by referring to the ECC. If so, the memory controller performs a calculation to generate information for correcting such error (106 in FIG. 1). Such information may include, for example, fail bit address information, which indicates a position of a fail bit in the chunk or an address of the fall bit in the memory array.

After the information for correcting the error is calculated at 106 or if the data chunk does not contain any error as determined at 104, the memory controller generates a data status indication code indicating error status of the data chunk (108 in FIG. 1). The data status indication code may indicate at least one of a fail bit number, a fail bit location, or a fail bit threshold voltage. Consistent with the disclosure, "fail bit number" refers to the number of fail bits in the data chunk, "fail bit location" refers to a location of a fail bit in the data chunk, and "fail bit threshold voltage" refers to a threshold voltage of a memory cell that stores a fail bit.

In some embodiments, the data status indication code includes two bits. For example, a code of "00" indicates that the data chunk read from the normal array does not contain any error ("Pass"); a code of "01" Indicates that the data chunk read from the normal array contains an error but the error can be corrected ("Correctable"), and the memory controller corrects the error and outputs a corrected data chunk; and a code of "10" indicates that the data chunk read from the normal array contains an error that cannot be corrected ("Uncorrectable").

At 110, the memory controller outputs the data status indication code to a user interface, such that the user receives information about the data error of the data chunk transmitted. The user interface may, for example, be an interface displayed on a screen.

Figure 2:
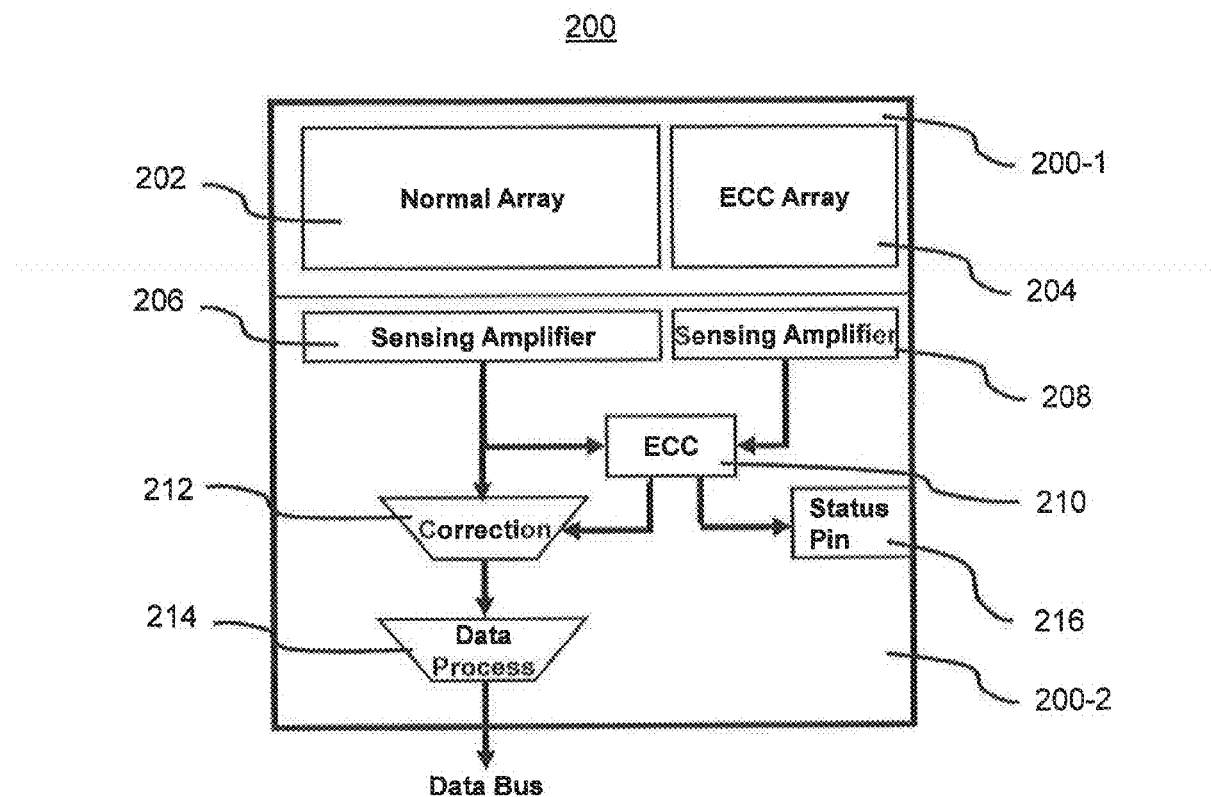
FIG. 2 is a block diagram schematically showing a structure of a memory device according to an exemplary embodiment.

FIG. 2 is a block diagram schematically showing a structure of a memory device 200 consistent with embodiments of the disclosure. The memory device 200 includes a memory array 200-1 configured to save data and a memory controller 200-2 controlling the operation of the memory device 200 such as, for example, reading data from and writing data to the memory array 200-1, and outputting data to outside of the memory device 200, such as to a data bus pin.

As shown in FIG. 2, the memory array 200-1 includes a normal array 202 storing user data and an ECC array 204 storing ECCs.

The memory controller 200-2 includes a first sensing amplifier 206, a second sensing amplifier 208, an error status decoding circuit 210 (labeled as "ECC" in the figure), a correction circuit 212 (labeled as "Correction" in the figure), a data processing circuit 214 (labeled as "Data Process" in the figure), and a status pin 216. Consistent with the disclosure, the correction circuit 212 and the data processing circuit 214 may each include, for example, a multiplexer. The first sensing amplifier 206 interacts with the normal array 202 to, for example, read the user data from the normal array 202. The second sensing amplifier 208 interacts with the ECC array 204 to, for example, read the ECCs from the ECC array 204. The first sensing amplifier 206 outputs the acquired user data to the correction circuit 212. Further, the first and second sensing amplifiers 206 and 208 respectively output the acquired user data and ECCs to the error status decoding circuit 210, which checks whether the user data contain any error and, if so, generates information for correcting such error. The error status decoding circuit 210 then outputs this correction information to the correction circuit 212, which uses the correction information to correct the user data received from the first sensing amplifier 206. The corrected user data is then output to the data processing circuit 214 for outputting to, for example, a data bus pin. If the user data read from the normal array 202 by the first sensing amplifier 206 do not contain any error, they are then passed by the correction circuit 212 to the data processing circuit 214 for outputting, and no correction is performed.

Consistent with embodiments of the disclosure, the error status decoding circuit 210 also generates a data status indication code indicating the error status of the corresponding data read from the normal array 202, and outputs the data status indication code to the status pin 216. The status pin 216 then outputs the data status indication code to a user interface for presenting to the user.

Figure 3:
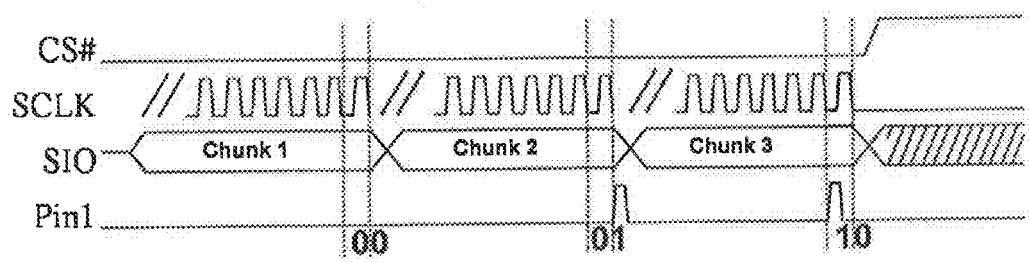
FIG. 3 schematically shows signal wave forms when outputting data error status according to an exemplary embodiment.

Memory devices consistent with embodiments of the disclosure, such as the memory device 200 shown in FIG. 2, may include, for example, parallel flash memories and serial flash memories. FIG. 3 schematically shows signal wave forms for an exemplary serial flash memory consistent with embodiments of the disclosure. In FIG. 3, CS# stands for "Chip Enable", which controls when the memory is enabled (operation on the memory can be performed when the memory is enabled); SIO stands for "Serial Input/Output," which represents the data output by the memory to, for example, the data bus pin; and SCLK stands for "Serial Clock." Further, in FIG. 3, "Pin1" represents the signal output by the status pin 216.

As shown in FIG. 3, one data chunk is output during a plurality of clock cycles of SCLK. A period of such a plurality of clock cycles may be referred to as an ECC correctable data period. In the example shown in FIG. 3, the data status indication code includes two bits. The two bits are output by the same status pin 216 at two clock cycles of the ECC correctable data period of the corresponding data chunk. In the example shown in FIG. 3, the two bits are sequentially output at the last two clock cycles of the ECC correctable data period. In some embodiments, the two bits may be output at other clock cycles of the ECC correctable data period. Moreover, in the example shown in FIG. 3, each of the two bits of the data status indication code is output during one clock cycle. In some embodiments, each of the two bits may be output during more than one clock cycle.

Figure 4:
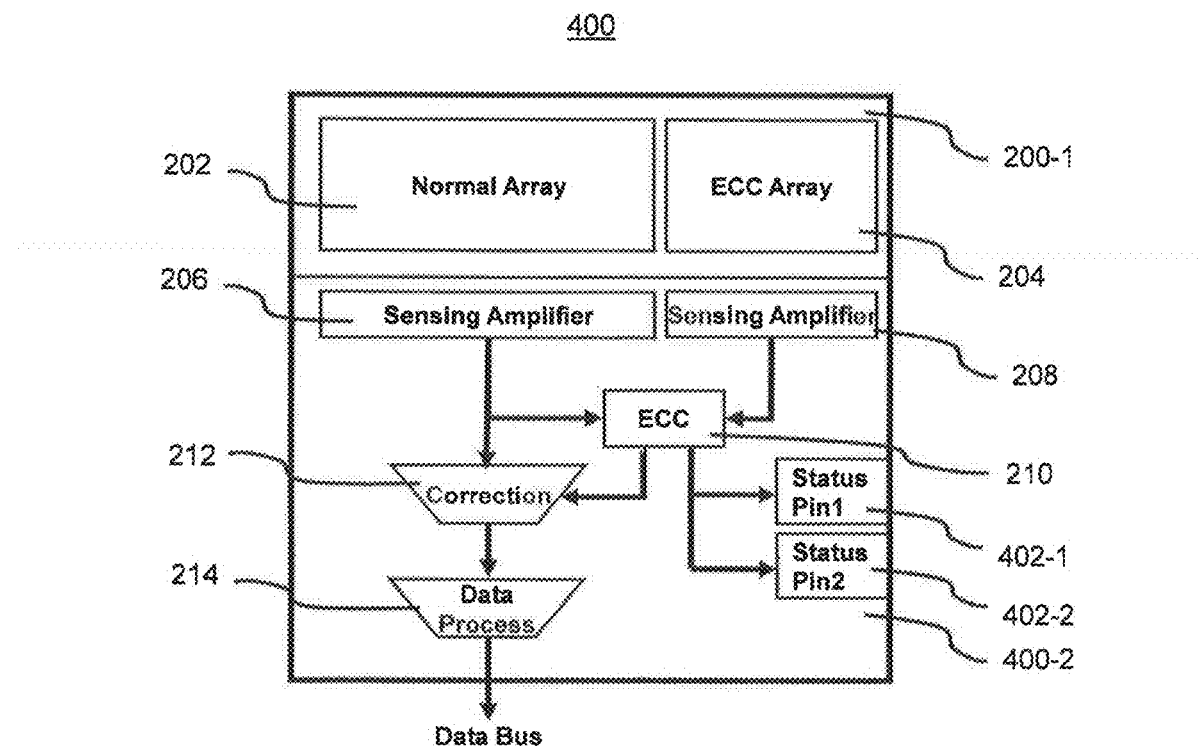
FIG. 4 is a block diagram schematically showing a structure of a memory device according to another exemplary embodiment.

Consistent with embodiments of the disclosure, a memory device may have more than one status pins for outputting a data status indication code that includes more than one bit. FIG. 4 is a block diagram schematically showing a structure of a memory device 400 consistent with embodiments of the disclosure. The memory device 400 is similar to the memory device 200, except that the memory device 400 includes a memory controller 400-2 having two status pins 402-1 and 402-2, each of which outputs one of two bits of a data status indication code.

Figure 5:
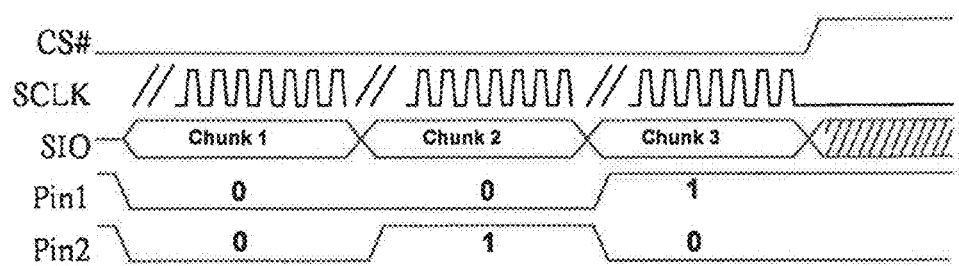
FIG. 5 schematically shows signal wave forms when outputting data error status according to another exemplary embodiment.

FIG. 5 schematically shows signal wave forms for an exemplary serial flash memory having two status pins consistent with embodiments of the disclosure. In FIG. 5, "Pin1" and "Pin2" represent the signals output by the status pins 402-1 and 402-2, respectively. Similar to the wave form shown in FIG. 3, in FIG. 5, one data chunk is output during one ECC correctable data period. The two bits of the data status indication code are simultaneously output by the different status pins 402-1 and 402-2, respectively, during the entire ECC correctable data period of the corresponding data chunk. In some embodiments, the two bits may be output by the status pins 402-1 and 402-2 during a portion of the ECC correctable data period.

Figure 6:
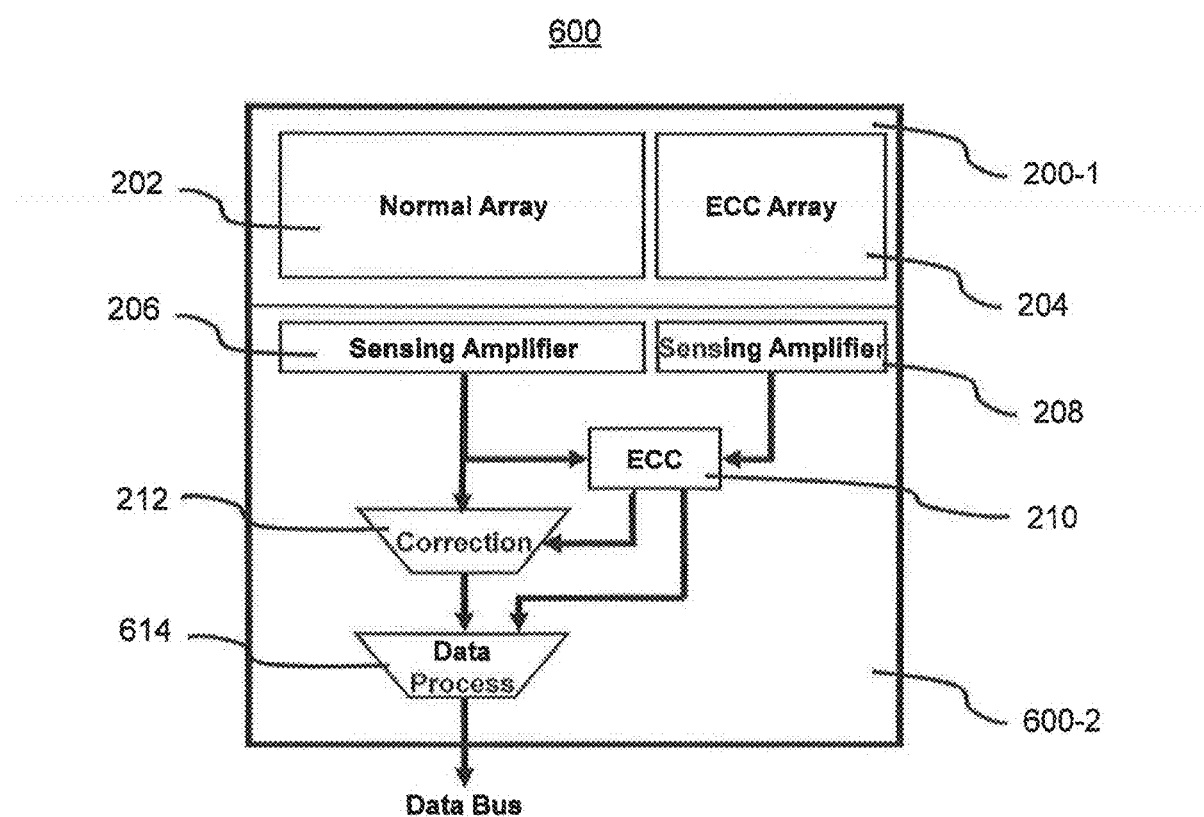
FIG. 6 is a block diagram schematically showing a structure of a memory device according to a further exemplary embodiment.

In the examples discussed above, a memory device consistent with embodiments of the disclosure outputs the data status indication code through at least one status pin. In some embodiments, a memory device does not need to include a status pin, but can output the data status indication code along with the user data. FIG. 6 is a block diagram schematically showing a structure of a memory device 600 consistent with embodiments of the disclosure. The memory device 600 differs from the memory devices 200 and 400 in that a memory controller 600-2 of the memory device 600 does not have a specifically assigned status pin for outputting the data status indication code. Instead, the error status decoding circuit 210 in the memory controller 600-2 outputs the data status indication code to a data processing circuit 614, which combines the data status indication code with the corresponding data chunk to generate an output signal and outputs the output signal to a data bus pin. Consistent with embodiments of the disclosure, the data status indication code can be added after the data chunk. Therefore, a serial flash memory consistent with embodiments of the disclosure outputs the data status indication code after outputting the data chunk.

Figure 7A:
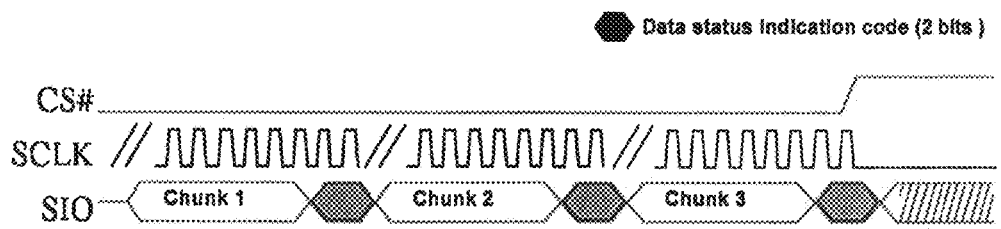
FIGS. 7A and 7B schematically show signal wave forms when outputting data error status according to further exemplary embodiments.

FIG. 7A schematically shows signal wave forms for an exemplary serial flash memory without status pins consistent with embodiments of the disclosure. In FIG. 7A, a data status indication code and its corresponding data chunk are output through the same pin, but during different clock cycles. The period of a plurality of clock cycles during which the data status indication code and its corresponding data chunk are output is also referred to as an output period. In the example shown in FIG. 7A, each data status indication code includes two bits, one of which is output at the next-to-last clock cycle of the output period and the other one of which is output at the last clock cycle of the output period.

Figure 7B:
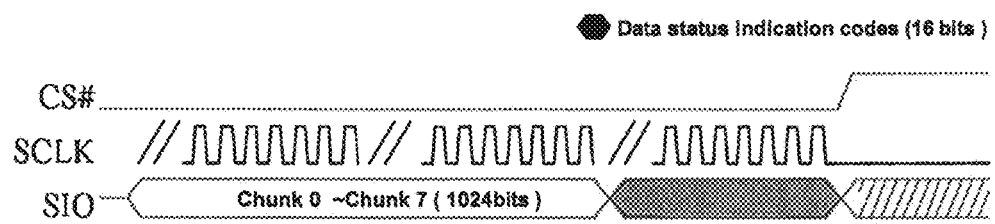

Data status indication codes and their respective corresponding data chunks do not have to be output in the fashion shown in FIG. 7A. FIG. 7B shows another exemplary outputting manner according to some embodiments of the disclosure. In the example shown in FIG. 7B, a data status indication code is not output immediately following its corresponding data chunk. Instead, eight data status indication codes are output together after their corresponding data chunks are output.

In the examples discussed above, a memory device automatically outputs a data status indication code when outputting its corresponding data chunk. However, the outputting of a data status indication code can be performed if needed. That is, in some embodiments, the memory device can provide the data status indication code in response to a user command. The user command can be entered by the user when he/she wishes to know the error status of a certain data chunk. In some embodiments, the user command can be transmitted to the memory device through the data bus pin.

Such a method can be implemented by any memory device consistent with embodiments of the disclosure, such as the memory device 200 shown in FIG. 2, the memory device 400 shown in FIG. 4, or the memory device 600 shown in FIG. 6.

In some embodiments, the memory controller of the memory device generates a plurality of data status indication codes, each of which corresponds to one of a plurality of data chunks being transmitted by the memory device. When the memory controller receives the user command, it outputs one or more of the data status indication codes, according to the instructions in the user command. In some embodiments, the memory controller of the memory device does not generate any data status indication code until it receives the user command.

In some embodiments, the data chunks are transmitted sequentially, and the user command instructs the memory controller to output the data status indication code corresponding to the last one of the data chunks. In some embodiments, the user command can instruct the memory controller to output the data status indication code corresponding to a certain one of the data chunks, or data status indication codes corresponding to certain ones of the data chunks. For a memory device having at least one status pin, such as that shown in FIG. 2 or 4, the data status indication code is output through the at least one status pin. For a memory device without status pins, such as that shown in FIG. 6, the data status indication code is output by the data processing circuit to a data bus pin that is used to output the data chunks.

Figure 8:
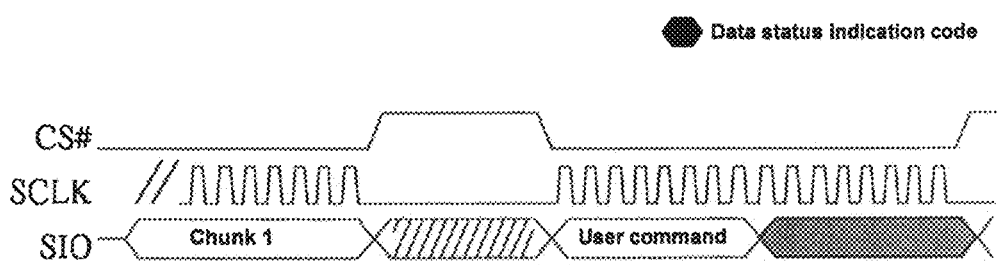
FIG. 8 schematically shows signal wave forms when outputting data error status according to another exemplary embodiment.

FIG. 8 schematically shows signal wave forms for an exemplary serial flash memory without status pins consistent with embodiments of the disclosure when outputting one or more data status indication codes after a user command is received.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A method for monitoring data error status of a memory device, comprising:
  generating, by a memory controller, a data status indication code indicating error status of a data chunk transmitted by the memory controller; and
  outputting, by the memory controller, the data status indication code to a user interface during a portion of a correctable data period,
  wherein
  the data status indication code includes two bits;
  the data status indication code indicates at least one of:
    a number of fail bits in the data chunk,
    a location of fail bits in the data chunk, or
    a threshold voltage of a memory cell in the memory device that stores the fail bits; and
  outputting the data status indication code includes outputting the two bits to the user interface through at least two respective external status pins, the two external status pins being different from a data bus pin for outputting the data chunk.
2. The method according to claim 1, wherein:
  outputting the data status indication code includes outputting the two bits through the two status pins simultaneously.

3. The method according to claim 2, wherein the memory device includes a serial flash memory;
the method further comprising transmitting the data chunk in a plurality of clock cycles;
wherein outputting the two bits includes outputting each of the two bits during the plurality of clock cycles.

4. The method according to claim 1, wherein the number of fail bits in the data chunk specifies a number of fail bits larger than a maximum number of correctable bits.

5. The method according to claim 1, wherein the user interface comprises an interface displayed on a screen.

6. The method according to claim 1, wherein the memory controller comprises an ECC circuit coupled to the two external status pins.

7. The method according to claim 6, wherein the memory controller comprises two sensing amplifiers connected to the ECC circuit.

8. The method according to claim 7, wherein the memory controller comprises a correction circuit coupled to the ECC array.

9. A method for monitoring data error status of a memory device that includes a serial flash memory, the method comprising:
generating, by a memory controller, a data status indication code that includes two bits indicating error status of a data chunk transmitted by the memory controller; and
outputting, by the memory controller, the data status indication code to a user interface,
wherein outputting the data status indication code includes:
combining the data status indication code with the data chunk to generate an output signal; and
outputting the output signal to a data bus pin by
outputting the data chunk and the data status indication code in a plurality of clock cycles;
outputting a first one of the two bits during a next-to-last clock cycle of the plurality of clock cycles; and
outputting a second one of the two bits during a last clock cycle of the plurality of clock cycles.

10. The method according to claim 9, wherein combining the data status indication code with the data chunk includes adding the data status indication code after the data chunk.

11. The method according to claim 10, wherein outputting the output signal includes outputting the data status indication code after outputting the data chunk.

12. The method according to claim 9, wherein generating the data status indication code includes generating a code indicating at least one of:
a number of fail bits in the data chunk,
a location of fail bits in the data chunk, or
a threshold voltage of a memory cell in the memory device that stores the fail bit.

13. A method for monitoring data error status of a memory device, comprising:
generating, by a memory controller, a plurality of data status indication codes, each of which corresponding to one of a plurality of data chunks being transmitted sequentially by the memory controller; and
outputting, by the memory controller, the data status indication code to a user interface,
wherein
the data status indication code includes two bits;
generating the data status indication code includes generating a code indicating at least one of:
a number of fail bits in the data chunk,
a location of fail bits in the data chunk, or
a threshold voltage of a memory cell in the memory device that stores the fail bits; and
outputting the data status indication code includes:
receiving a user command to output one of the plurality of data status indication codes that corresponds to one of the plurality of data chunks, and
outputting the two bits to the user interface through at least one external status pin sequentially after receiving the user command, the at least one external status pin being different from a data bus pin for outputting the data chunks.

14. The method according to claim 13, wherein the memory device includes a serial flash memory;
the method further comprising transmitting the data chunk in a plurality of clock cycles;
wherein outputting the two bits includes:
outputting a first one of the two bits during a first one of the plurality of clock cycles; and
outputting a second one of the two bits during a second one of the plurality of clock cycles.

15. The method according to claim 14, wherein:
outputting the first one of the two bits during the first one of the plurality of clock cycles includes outputting the first one of the two bits during a next-to-last clock cycle of the plurality of clock cycles; and
outputting the second one of the two bits during the second one of the plurality of clock cycles includes outputting the second one of the two bits during a last clock cycle of the plurality of clock cycles.

16. The method according to claim 13, wherein receiving the user command to output the one of the plurality of data status indication codes includes receiving a user command to output one of the plurality of data status indication codes that corresponds to a last one of the plurality of data chunks.

17. The method according to claim 13, wherein outputting the data status indication code includes outputting the data status indication code through a data bus pin for outputting the data chunk.

* * * * *